US010970274B2

(12) United States Patent
Bisbee et al.

(10) Patent No.: US 10,970,274 B2
(45) Date of Patent: Apr. 6, 2021

(54) SYSTEM AND METHOD FOR ELECTRONIC DATA CAPTURE AND MANAGEMENT FOR AUDIT, MONITORING, REPORTING AND COMPLIANCE

(71) Applicant: eOriginal, Inc., Baltimore, MD (US)

(72) Inventors: Stephen F. Bisbee, Baltimore, MD (US); James W. Tebay, Asheville, NC (US); Adam J. Attinello, Fulton, MD (US)

(73) Assignee: eOriginal, Inc., Baltimore, MD (US)

( * ) Notice: Subject to any disclaimer, the term of this patent is extended or adjusted under 35 U.S.C. 154(b) by 251 days.

(21) Appl. No.: 15/761,264

(22) PCT Filed: Sep. 19, 2016

(86) PCT No.: PCT/US2016/052534
§ 371 (c)(1),
(2) Date: Mar. 19, 2018

(87) PCT Pub. No.: WO2017/049309
PCT Pub. Date: Mar. 23, 2017

(65) Prior Publication Data
US 2018/0276270 A1 Sep. 27, 2018

Related U.S. Application Data

(60) Provisional application No. 62/219,930, filed on Sep. 17, 2015.

(51) Int. Cl.
G06F 16/23 (2019.01)
G06Q 30/02 (2012.01)
(Continued)

(52) U.S. Cl.
CPC ...... G06F 16/2379 (2019.01); G06F 21/6218 (2013.01); G06Q 20/401 (2013.01);
(Continued)

(58) Field of Classification Search
CPC ............ G06F 16/2379; G06F 21/6218; G06Q 20/401; G06Q 30/0241; G06Q 30/0601; G06Q 40/02
(Continued)

(56) References Cited

U.S. PATENT DOCUMENTS 5,615,268 A 3/1997 Bisbee et al.
5,748,738 A 5/1998 Bisbee et al.
(Continued)

OTHER PUBLICATIONS

R. L. Rivestet al., "A Method for Obtaining Digital Signatures and Public-Key Cryptosystems," Communications of the ACM vol. 21, pp. 120 126 (Feb. 1978).
(Continued)

Primary Examiner — Hosain T Alam
Assistant Examiner — Nicholas E Allen
(74) Attorney, Agent, or Firm — Royal W. Craig; Gordon Feinblatt LLC

(57) ABSTRACT

A software-based method and system for maintaining documents and datasets associated with a given commercial transaction as original, authenticated documents or datasets associated with the underlying transaction. Datasets that have been designated as "auditable" are maintained by the system as tamper-evident and reflect the data actually provided to the system by the transaction owner or a trusted third party at each stage of the transaction. In certain preferred embodiments the system establishes and maintains a verified, original audit trail or trails reflecting the custodial chain of ownership of said data. A visual interface is provided to the stakeholders for secure access to authoritative copies of documents, transaction data and the related audit trails. In addition, the system includes real-time analytics and monitoring with threshold-based alerts, and drill-down capability to any level of the data, documents and audit trail.

17 Claims, 7 Drawing Sheets

(51) Int. Cl.
*G06Q 30/06* (2012.01)
*G06Q 40/02* (2012.01)
*G06F 21/62* (2013.01)
*G06Q 20/40* (2012.01)

(52) U.S. Cl.
CPC ..... *G06Q 30/0241* (2013.01); *G06Q 30/0601* (2013.01); *G06Q 40/02* (2013.01)

(58) Field of Classification Search
USPC .......................................................... 707/703
See application file for complete search history.

(56) References Cited

U.S. PATENT DOCUMENTS

| | | | |
|---|---|---|---|
| 6,237,096 B1 | 5/2001 | Bisbee et al. | |
| 6,367,013 B1 | 4/2002 | Bisbee et al. | |
| 7,162,635 B2 | 1/2007 | Bisbee et al. | |
| 7,181,017 B1* | 2/2007 | Nagel | H04L 9/0825 380/282 |
| 7,743,248 B2 | 6/2010 | Bisbee et al. | |
| 8,924,302 B2 | 12/2014 | Bisbee et al. | |
| 2001/0002485 A1 | 5/2001 | Bisbee et al. | |
| 2001/0047326 A1 | 11/2001 | Broadbent et al. | |
| 2005/0210263 A1* | 9/2005 | Levas | G06F 21/33 713/182 |
| 2008/0052102 A1* | 2/2008 | Taneja | G06Q 10/063 705/7.11 |
| 2008/0109496 A1 | 5/2008 | Holenstein et al. | |
| 2008/0120129 A1* | 5/2008 | Seubert | G06Q 10/10 705/35 |
| 2010/0241595 A1* | 9/2010 | Felsher | G06F 19/328 705/400 |
| 2010/0275040 A1 | 10/2010 | Ginter et al. | |
| 2012/0086971 A1* | 4/2012 | Bisbee | H04L 9/321 358/1.14 |
| 2013/0276142 A1* | 10/2013 | Peddada | G06F 21/62 726/28 |
| 2014/0089113 A1* | 3/2014 | Desai | G06Q 20/322 705/16 |
| 2014/0344005 A1* | 11/2014 | Jayade | G06Q 10/06316 705/7.26 |
| 2015/0180833 A1* | 6/2015 | Snow | G06Q 10/10 713/155 |

OTHER PUBLICATIONS

M. E. Hellman, "The Mathematics of Public-Key Cryptography", Scientific American, vol. 234, No. 8, pp. 146 152, 154 157 (Aug. 1979).

W. Diffie, "The First Ten Years of Public-Key Cryptography", Proceedings of the IEEE, vol. 76, pp. 560 577 (May 1988).

C. E. Shannon, "Communication Theory of Secrecy Systems", Bell Sys. Tech. J. vol. 28, pp. 656 715 (Oct. 1949).

ITU X.509v3 (1993)/ISO/IEC 9594 8:1995, "The Directory: Authentication Framework" or in IETF Internet X.509 Public Key Infrastructure Certificate and CRL Profile<draft-ietf-pkix-ipki-part1-11>.

* cited by examiner

SYSTEM AND METHOD FOR ELECTRONIC DATA CAPTURE AND MANAGEMENT FOR AUDIT, MONITORING, REPORTING AND COMPLIANCE

CROSS REFERENCE TO RELATED APPLICATIONS

The present application derives priority from U.S. provisional application Ser. No. 62/219,930 filed 17 Sep. 2015.

BACKGROUND OF THE INVENTION

1. Field of the Invention

The present invention relates generally to systems and methods for providing a verifiable chain of evidence throughout an entire electronic transaction involving the secure creation, collection and maintenance of authenticated data related to each stage of the transaction and the authenticated original electronic documents and other information objects underlying such transaction, all in digital formats, in order to provide audit, monitoring, verification and reporting capabilities at the information object level, for the aggregate of such information objects across multiple stages of such transaction, and across multiple transactions in the aggregate.

2. Description of the Background

The continuing evolution of methods of commerce is evident in the increasing replacement of paper-based communications and transactions with electronic communications and transactions. When communication is by electronically reproduced messages such as e-mail, facsimile machine, imaging, digital documents, electronic data interchange or electronic fund transfer, however, there no longer exists a handwritten signature or a notary's raised seal to authenticate the identity of a party to a transaction. Further, unlike the words of a document that are largely fixed on a page in a human readable format, the content of an electronically prepared, communicated and executed document stored in machine readable format can be subject to alteration and tampering after execution. Additionally, the creation and processing of electronic transactions result in the collection and generation of multiple elements of data at each stage of the transaction, through multiple third party systems involved at differing stages of the transaction, only some of which data is reflected in the underlying executed transaction documents.

To address these problems with electronic documents, a third-party operated Trusted Repository System (TRS) has been described that provides secure deposit and authentication of electronic documents and other information objects into a secure and trusted repository. The TRS advantageously utilizes an asymmetric cryptographic system that help to ensure that a party depositing an information object is electronically identifiable as such, and that the integrity of electronically stored documents and other information objects are protected after deposit and even after transfer of control of such documents and information objects to a transferee. These information objects may include document execution information, electronically signed documents, and other information objects representing or containing information related to the overall transaction. The TRS logically relates all the deposited information objects to the owner of such information objects, such that the owner may verify, monitor, analyze, audit and evaluate the information objects, regardless of whether the owner originated the deposited information objects or received the deposited information objects by transfer after origination.

As an initial matter, it will be helpful to understand the following terminology that is common in the field of secure electronic commerce and communications.

"Public key cryptography (PKC)" is a cryptographic technique that uses a pair of "keys", one private (secret) key and a public key that are associated with respective registered users. The public keys are published for anyone to use for encrypting information intended for the respective users. Only the holder of the paired private key can decrypt and access an electronic information object encrypted with the public key. Conversely, the bolder of u user's public key can decrypt and access an electronic information object that was encrypted using that user's private key. The encrypt and decrypt functions of the two keys are truly "one-way", meaning that it is not possible to determine a private key from the corresponding public key, and vice versa, due to the fact that it is currently computationally easy for a computer to identity large prime numbers but extremely difficult for a computer to factor the products of two large prime numbers.

The one-way characteristic of a PKC system also enables a private key holder to "digitally sign" an electronic information object by creating a "hash" of the information object itself and then encrypting the hash with the private key and appending the encrypted hash (now referred to as a digital signature) to the original information object. The hash is produced by applying an algorithm to the information object to be digitally signed, the results of which correspond directly to the information object so that the slightest change in the information object itself will result in a change in the hash. On receipt, a public key holder can verify a digital signature by decrypting the hash and comparing the decrypted hash to a newly computed hash of the information object. If the two hashes match the recipient can be assured that the user appending the signature to the information object was in possession of the private (secret) key and is thus presumably whom they purport to be. Comparison of the newly computed hash to the decrypted hash also verities that the information object itself has not been altered since it was signed. If the new hash matches the original hash decrypted with the public key then the recipient can be assured that the information object itself has not been altered as even the slightest change in the information object itself will result in the two hashes not matching. Example PKC algorithms that comply with government and/or commercial standards include the digital signature algorithm (DSA/RSA) and secure hash algorithm (SHA-1/MD5).

A "digital signature" is a cryptographically created data element that is logically associated with, applied or otherwise appended to an electronic information object with the intent of the creator to indicate their assent to the information contained in the information object or their willingness to be otherwise bound by the terms or conditions recited in the information object. As described, a digital signature is typically created by "hashing" an electronic information object and encrypting the resulting hash (integrity block) using the signer's private (secret) key and thereafter appended to the electronic information object.

An "electronic signature" is any one of the mechanical, holographic, digital, voice, video or biometric signatures, or such other electronic sound, symbol, picture, or process that is logically associated, applied or attached to an electronic document with the intent or commitment of the signer to sign or otherwise be bound by the terms of the electronic document. Electronic signatures may contain additional information about the signer (e.g., name, email address, etc.) and the signing event (e.g., reason, date and time, place, etc.).

An "authentication certificate" is an unforgeable data element that binds a user's public key to that user's identity information and that advantageously, but not necessarily, conforms to the international standard X.509 version 3, "The Directory-Authentication Framework 1988", promulgated by the International Telecommunications Union (ITU). Authentication certificates are issued by a Certificate Authority (CA) that is a known entity and is responsible for ensuring the unique identification of all of its users and both source and content integrity of the information contained in the certificate. An authentication certificate is created when a CA uses its own private key to digitally sign (i.e. hash and encrypt) an individual's public key along with certain of the individual's identifying information (name, location etc.) and certain information regarding the certificate itself (issuer, expiration date etc.). The act of digitally signing by the CA makes a certificate substantially tamper-proof such that farther protection is not needed. The intent of the certificate is to reliably associate (bind) a user's identity to the user's public cryptographic key.

Each authentication certificate includes the following critical information needed in the signing and verification processes: a version number, a serial number, an identification of the Certification Authority (CA) that issued the certificate, identifications of the issuer's hash and digital signature algorithms, a validity period, a unique identification of the user who owns the certificate, and the user's public cryptographic signature verification key.

Certificate extensions can also be used as a way of associating additional attributes with users or public keys, and for managing the public key infrastructure certificate hierarchy. A user's authentication certificate is advantageously and preferably appended to an electronic information object that the user has digitally signed with the user's private key so that it is possible to verify the digital signature by decrypting the user's public key with the known and trusted CA's public key. Alternatively, the certificate may be retrieved from the issuing CA or directory archive.

The "Public Key Infrastructure (PKI)" is the hierarchy of CAs responsible for issuing authentication certificates and certified cryptographic keys used for digitally signing and encrypting information objects.

A "wrapper" is used to securely hold and associate digital or electronic signatures with part or all of one or more electronic information objects contained therein. Wrappers may take the form of any open standard enveloping or information object (document) formatting schemas. Two examples are the RSA Public Key Cryptographic Standard (PKCS) #7 and the World Wide Web Consortium (W3C) Extensible Markup Language (XML) Signature Syntax and Processing Draft Recommendation. The RSA PKCS #7 standard supports zero, one, and multiple parallel and serial digital signatures (cosign and countersign). An unauthenticated attribute is not protected. Some other formats that provide support for signature syntax, processing and positioning (tags) are S/MIME, HTML, XHTML, and XFDL. Any of these wrapper formats can be applied recursively and markup languages extended to provide signature and protection layering.

As described in U.S. Pat. Nos. 5,615,268, 5,748,738, 6,237,096, 6,367,013, 7,162,635, 7,743,248 and 8,924,302 to Bisbee et al., an original electronic document or information object having the same legal weight as a blue-ink-signed paper document (e.g., it negotiable instrument or chattel paper) is made possible by contract and by PKI and associated computer technology. An electronic document, or more generally an information object, is created and transferred to a Trusted Repository System (TRS) that is specifically designed and empowered by contract to securely and reliably store any such object for its foil effective life. The contractual aspect is an agreement between the TRS and the party submitting or relying on the electronically signed information object to accept reliance on the TRS as the custodian of the information object.

The TRS implements defined business rules for information objects handled by the TRS (i.e., a complete set of authorized actions). The TRS also implements a defined security policy (i.e., a set of protective measures that is necessary to prevent unauthorized actions). The TRS uses its business rales and security policy to govern requests and access to the TRS over the respective life cycles of all documents and other information objects within its control, verifying the identities and authorities of parties (local and remote) requesting access. The TRS securely stores and securely retrieves digitally signed, authenticated, and encrypted information objects such as electronic documents. Upon request the TRS prints and issues certified copies of information objects. The TRS advantageously supports a multi-port token server for proving electronic document authenticity, for verifying the identities of signing parties, and for authenticating electronic document submissions. The TRS provides for backup and disaster recovery, and ensures that stored information is not lost within a specified retention period, whether that period is specified by a user, law, or regulation.

For certain transactions, the electronic deposit process must comply with various Federal and State laws. Such laws include State enactments of the Uniform Commercial Code (UCC) § 9-105, which provides a legislative framework that gives secured parties the ability to implement electronic systems for keeping track of and controlling "electronic chattel paper" (documents that evidence both a monetary obligation and a security interest). For electronic chattel paper, UCC ≡ 9-105(a) requires the secured party to maintain a system (such as the TRS with which a secured party may contract) employed for evidencing the transfer of interests in the electronic chattel paper, which system reliably establishes the secured party as the person to which the chattel paper was assigned. The UCC also provides more detailed specifications for such a system which will meet the broad requirements of § 9-105(a). Such a system must create, store, and assign electronic chattel paper in such a manner that:

(1) a single authoritative copy of the record or records exists which is unique, identifiable and, except as otherwise, provided in (4), (5) and (6) below, unalterable;

(2) the authoritative copy identifies the secured party as the assignee of the record or records;

(3) the authoritative copy is communicated to and maintained by the secured party or its designated custodian;

(4) copies or amendments that add or change an identified assignee of the authoritative copy can be made only with die consent of the secured party;

(5) each copy of the authoritative copy and any copy of a copy is readily identifiable as a copy that is not the authoritative copy; and (6) any amendment of the authoritative copy is readily identifiable as authorized or unauthorized.

With the foregoing background, it should be clear that there are many different steps involved and many third party participants in certain transactions. As an example, assume that a car dealer initiates an advertising campaign offering special purchase terms to car buyers who purchase within the sale period. A potential new car buyer comes into the dealership in response to the ad and seeks financing under the advertised terms to purchase one of the dealer's cars. The buyer completes a loan application with the car dealer and also provides other information which may include information regarding the car sought by the buyer or regarding the buyer him or herself. The dealer then sends the application and supporting data to its underwriters to determine the buyer's creditworthiness. The underwriting process generates additional data such as the buyer's credit report, reference check information, and credit ratings. Based on the results of that review, the dealer sends the loan application and underwriting results to certain of its associated banks for loan acceptance. These banks then perform their own underwriting to confirm the dealer's assessment of the buyer's creditworthiness, and then provide the dealer with an approval notice and loan terms, or a rejection notice. The dealer then presents the loan's terms to the buyer who, upon acceptance of such terms, buys the car and the dealer closes the loan. From the point of closing, data is continually generated regarding servicing and processing of the car loan, such as collection and payment history. Additionally after loan closing, the dealer then may pool the buyer's loan with loans of other buyers and collateralize those loans with a bank, finance company, or credit union to obtain operational financing to buy more ears to sell. At that time, additional data is generated and exchanged between the dealer and the funding entity, such as information regarding the creditworthiness of the dealer and other information related to the dealer itself and the terms of the loan the dealer seeks. Alternatively, the dealer may pool the buyer's loan with the loans of other buyers and resell the bundled loans, which are then bundled with other auto loans by an investment banking firm pursuant to certain parameters, and interests in the entity now owning such loans are sold as securities to investors, mutual funds, insurance companies and hedge funds. During this process, the parties generate and exchange data such as the parameters of the set of bundled loans and the terms of the sale.

The entire transaction process of lead generation, loan origination, third-party data collection, underwriting, collateralization, and securitization entails multiple participants, each generating, delivering and receiving multiple datasets, as wells as the many electronic documents and other information objects related to such transaction process. Mistakes, false advertising, and loan fraud keep regulators busy, and the U.S. maintains separate securities, commodities, and insurance regulatory agencies, as well as bank regulatory agencies, both at the Federal and state level to combat these problems. However, none of these regulators, nor any of the interested third parties, have any overarching paper trail or any convenient way to audit the entire transaction from lead generation to current ownership of the underlying assets and must approach each participant stakeholder individually at various stages of the transaction to obtain the relevant data, documents and information for audit. Indeed, most financial services audit processes rely on creating custom databases for each audit request and then pulling records in from multiple storage repositories—some for data and some for documents. There is presently no existing commercially available system for providing secure access to the entire transaction, including all authenticated origination and processing data and authoritative copies of documents and complete audit trails for such, with real-time analytics, verification and monitoring, auto-alerts, and drill-down capability from the aggregate level across multiple transactions to any level of the underlying data or the underlying documents.

There have been efforts. United States Patent Application 20010047326 by Broadbent, David F. et al. published Nov. 29, 2001 shows an extensive compliance dashboard for monitoring and tracking a mortgage loan from origination to post closing. The Broadbent system ostensibly interfaces with all stakeholders and enables regulators to see if the workflow is consistent with the lenders' or mortgage brokers' policies, pricing, underwriting rules and guidelines in consideration of the borrowers' files. Regulators can get auto-alerts and drill down to examine any part of the loan file borrower data which may include the application, appraisal, title report, credit report, income verification (tax returns, W-2's, paystubs, contracts, 1099's), asset verification (bank deposit receipts, bank statements, verification of deposits, mutual funds, any retirement accounts that contain liquid assets), credit explanation letters, releases from third parties, budgets, net tangible benefit letters, suitability letters, personal financial statements, loan disclosures, loan contracts (mortgage note or deed of trust). Regulation Z Truth-in-Lending statement. Good Faith Estimate, Equal Credit Opportunity Act disclosure, and any other legally required disclosures. The Broadbent '7326 application does the foregoing through an XML API implemented in the loan origination system (LOS). The XML API applies and enforces a set of rules appropriate to each mortgage loan transaction, monitoring, compliance via the LOS.

The problem here is that the Broadbent '7326 application is not implemented in the context of a system that securely and reliably stores myriad electronic information objects and documents, both originals and authoritative copies, for their full effective life. Moreover, "loan origination", as shown in the Broadbent '7326 application, only includes the steps from taking a loan application to disbursal of funds (or declining the application). It does not include precursor lead generation nor docs it include post-origination servicing, collateralization, securitization or sale. After closing on the loan, even before investment bank securitization and bundling, individual asset-level detail is lost. To encompass the entire transaction a fundamentally different approach is needed, one that includes and securely verities the full lead generation, loan origination, servicing, col lateralization, and securitization datasets, which allows aggregation and analysis of data, documents and other information objects across multiple transactions and in multiple stages in such transactions, and which preserves drill-down capability to information object-level detail even alter bundling and transfer. Moreover, it is necessary to analyze the foil transaction lifecycle with "real-time" reporting and analysis. All the foregoing must be accomplished without breaching the chain of trust established by the data authentication and management system during transmission, storage, and retrieval of verifiable copies of the stored original data, documents, and other information objects (e.g., without the data authentication and management system relinquishing control).

SUMMARY OF TOE INVENTION

Applicants' invention solves these and other problems suffered by prior approaches with a software-based method and system that provides real-time robust aggregate and asset-level reporting and analysis that allows users to quickly respond to audit requests and prevent errors and resubmissions. To implement the foregoing, the herein-described improved Trusted Repository System (TRS) allows for the secure upload of authenticated transaction data, documents and other information objects, and aggregates such information objects from all involved stakeholders, to securely and reliably store any such information object for its foil effective life. The TRS also offers a dashboard interface for allowing stakeholders and regulators to access the data and the underlying other information objects with real-time specificity. The foregoing is accomplished primarily by combining a novel approach to uploading and maintaining data, and structuring data relationships, that allows more effective and verifiable aggregation, including aggregation of data associated with a pre-existing transaction or document already maintained on the TRS, to allow for full analysis, auditing and reporting on the aggregated data and the related documents.

Similarly, the TRS compiles a complete audit record regarding all documents and information objects related to a transaction, and optionally compiles a complete audit record regarding all auditable data, for all involved stakeholders (lenders, document preparation companies, finance companies, lead originators, servicers, financial custodians, investors, and regulators, etc). At least two distinct levels of audit trails are created and maintained by the TRS: a transaction profile-level audit trail and document profile-level audit trail. It is alternatively contemplated that the TRS: may additionally separately maintain a separate audit trail which is data-specific. These audit trails consist of a sequential listing of important events and interactions conducted with respect to information objects on the TRS, which record is digitally signed by the TRS to make such record tamper evident. The TRS also compiles a transaction profile-level audit log and a document profile-level audit log reflecting day-to-day activities conducted by users with respect to data and documents which events are not digitally signed in the audit trail.

The TRS formats the audit trail such that it includes suitable instructions for pursing and processing its contents. A convenient form of wrapper (e.g., PFM, RSA PKCS #7, or S/MIME) or markup language (e.g., HTML, XML, or XFDL) can be used for this purpose, the contents can be one or more information objects (each comprising one or more electronic documents, images, computer source code, computer executable code, databases, data compilations, etc.), date-time stamps, digital signatures and matching certificates, electronic signatures, and/or indicators, which include, but are not limited to, content types, object identifiers, and encoding rules and tags. In the case of the audit trail, the contents of the wrapper consist of audit entries and the TRS date and time stamp and digital signature. Each time additional audit entries are added to the audit trail, the TRS combines the new entries with the existing digitally signed entries and applies a recursive wrapper over the package to provide signature and protection layering.

The TRS authenticates the ability of the user to upload data, documents and other information objects to the TRS on behalf of the transaction owner, and the same owner system from which documents and information objects are uploaded to the TRS is also the system which originated the dataset used to populate the transaction documents and information objects for execution. This ensures the dataset uploaded from such system accurately represents the dataset relied upon by the stakeholder at that stage in the transaction and also accurately reflects the dataset used to generate and populate any documents and information objects uploaded onto the TRS at that same time.

The present system and method is fully compatible with a TRS that securely and reliably stores and manages myriad electronic information objects, both originals and authoritative copies, for their full effective life. The system and method may be used across multiple industries for digital signing and full lifecycle vaulting and management of electronic records, including the data and other information objects underlying each stage representing the origination, closing and transfer of such electronic records, where stakeholders conduct deal closings and subsequent financings on such assets in automotive finance, mortgage, vacation ownership, equipment leasing, solar equipment consumer installations, security alarm services, and other industries, including those where a purchase or lease of real property, goods or services is made and payment terms for the purchase or lease are agreed upon. The added TRS digital signature functionality applied to data designated as "auditable" to make the dataset tamper evident from the time of upload, as well as the optional tamper evident audit trail reflecting maintenance, of such dataset from upload onto the TRS, are also beneficial to those industries where regulator and funding source audits are prevalent. All data, documentation and information objects involved in such industries can be uploaded onto the TRS along with lead generation information, loan applications, approvals, loan agreements and payment tracking to provide a single repository documenting proof of the actual lending practices implemented by the originating stakeholder and all subsequent transferee stakeholders with respect to each loan, and making such information available to other interested stakeholders not involved in the origination, closing or servicing processes, and to provide data reporting and other data functionality to all such parties.

BRIEF DESCRIPTION OF THE DRAWINGS

FIG. 3 is a screen shot the pop-up for adding and configuring a new data field.

FIG. 5 is a screen shot of the dashboard transaction search results screen which displays the transaction profile for Asset ID #21.

FIG. 6 is a screen shot of the dashboard document history screen which displays the document profile-level audit log and audit trail.

DETAILED DESCRIPTION OF If IE PREFERRED EMBODIMENT

The present invention is a method and system for receiving, authenticating and aggregating transaction related information objects in a Trusted Repository System (TRS) from all involved stakeholders for secure, documented and reliable storage, management, and access over the transaction's full effective life. Stakeholders and regulators at any stage in the transaction may access the aggregated and authenticated information objects, and the verified audit trails associated therewith, with real-time specificity.

The present system is implemented within a document and information object handling infrastructure (method and computer system) for establishing and maintaining a chain of trust in a TRS during transmission, storage, and retrieval of verifiable copies of the stored original documents and information objects. The audit trails constructed by the TRS reflects a chain of evidence, and the audit trails and the stored data, documents and other information objects are made selectively available to stakeholders and/or auditors by a dashboard user interface (or, alternatively, via API call for integrated third party systems) that enables users to analyze all or only portions of transactions with "real-time" audit reports. Moreover, the system preserves drill-down capability to asset-level detail even after securitization or sale of the asset. The TRS likewise preserves its chain of trust in the data, documents and information objects as well, presiding access to each piece of data and each document and each information object without the TRS relinquishing control.

The Computer Architecture

The invention can be implemented utilizing commercially available computer hardware to create an integrated closed system for authentication Off electronic data, documents and other information objects, as will be defined below.

Figure 1:
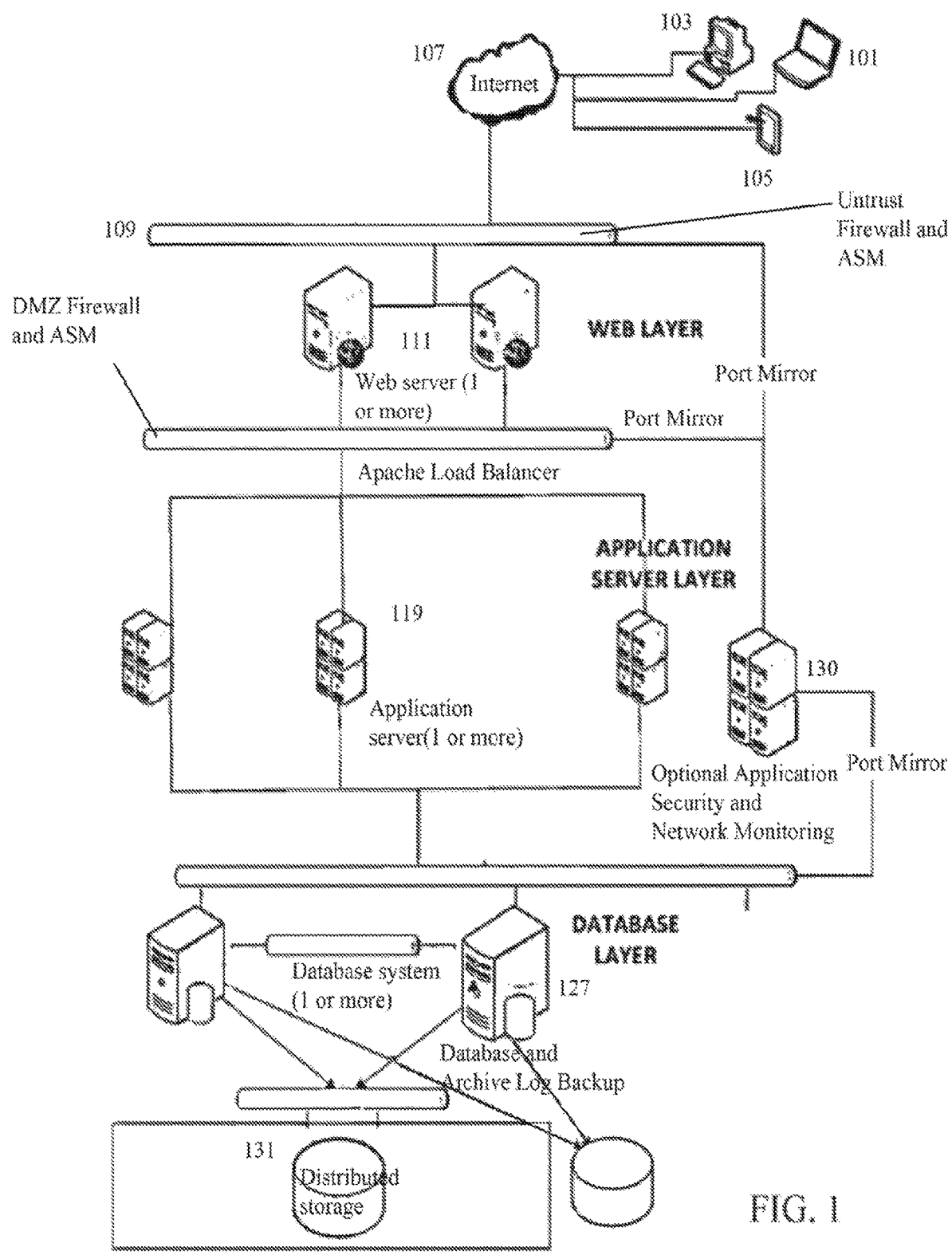
FIG. 1 is a schematic view of a trusted repository system architecture.

With reference to FIG. 1, a diagram of a high availability, secure trusted repository system architecture is provided that ensures the security of the authoritative copy of an electronic document, information object or dataset and any affixed electronic signatures or information. All computing components behind the firewall 109 are housed in a physically secure facility and make up the components of the trusted repository system (TRS). Strong authentication is required for client workstations and devices to access the TRS, and no TRS resource can be accessed directly. Authorized instructions that may accompany payloads (e.g. electronic documents, electronic signature blocks, etc.) are required to request and receive TRS services.

An Internet browser running on a workstation such as a laptop 101, PDA 105 or desktop 103 equipped with an input device such as a mouse, keyboard, stylus, or voice to text conversion, is required for client access to the TRS. The workstation transmits a request protected through the use of X.509 certificates and asymmetric cryptography to authenticate the counterpart with whom they are communicating, and to negotiate a symmetric session key (such as TLS or SSL) via the Internet 107 or other data network to the firewall 109 which forwards the request to a web server 111. The web server 111 acts on the request and forwards the instruction and/or payload to any available application server 119. The application server performs the requested actions, applying, storing, retrieving, auditing, sealing, authenticating, etc. electronic information objects that are stored and retrieved using a database management system (DBMS) 127. Actual storage media can be handled externally by a storage area network 131. All network and application traffic can be mirrored to an external application security module 130 for intrusion detection and prevention monitoring and alerting. The TRS necessarily performs all requested authorized actions without ever disclosing the actual authoritative copy of the electronic document or information object. The TRS provides centralized support for a distributed network of clients and supports a wide range of present and future e-commerce applications by providing a secure, standards-based foundation upon which business applications can be and are built.

TRS Chain of Trust

As an initial step, information objects, including data and electronic documents, identified by a transfer agent may be uploaded to the TRS. An originator of an information object and any subsequent submitter of information objects are referred to as "transfer agents" and, if such information objects are not originated using the electronic signature functionality of the TRS, such transfer agent attests to the integrity and validity of an information object before it is submitted to the TRS. A transfer agent is authorized to submit information objects such as an electronic document to the TRS, typically using API calls via a third party system managed by such transfer agent, or manually using the TRS dashboard via a workstation such as laptop 101, pad 103, PDA 105, or a desktop or similar system. It will be appreciated that a transfer agent is identified to the TRS by the possession and use of a valid user ID and password and a third unique credential or, where stronger authentication is required, an authentication certificate and private key. As noted, the authentication certificate also contains one or more additional identifying attributes of the transfer agent. The TRS access database contains additional transfer agent attributes such m system access rights and capabilities. The TRS validates the transfer agent's identity and rights and, if the upload is being done by means other than the electronic signature functionality of the TRS, verifies the integrity of submitted information object Once the TRS determines that an information object has not been altered during submission and that the information object's transfer agent has the proper authorizations, the TRS assumes custody and control of the information object and responsibility for the information object's preservation by applying a tamper seal. The tamper seal includes a current date-time stamp and the TRS's digital signature to eliminate the possibility of unauthorized, undetected alteration or tampering with all information object subsequent to its original submission and sealing.

Data Aggregation and Structure

The following terminology is used herein to describe the inventive system:

A "transaction profile" is a record that defines options and settings for completing a transaction or modifying the transaction or uploading one or more information, objects (which may consist of a dataset) related generally to such transaction. A transaction profile is associated With a particular owner of such transaction and a transaction type for the transaction, and is populated with information to create a profile record for a particular transaction of such owner.

A "document profile" is a record that defines options and settings for executing, reviewing or uploading one or more information objects (which may consist of a document and/or a dataset). A document profile is associated with a particular owner of such information object, a transaction profile, and a document type for the information object. The document profile is populated with information to create a profile record for a particular document or other information object, and/or dataset related to such Information object or the related transaction profile, which information object may be executed by a particular party in connection with the related transaction.

An "audit entry" is an entry in an audit log or an audit trait (both of which are described in more detail below) and which represents an event or activity related to a given document profile or transaction profile, or related to an information object or data associated with a given document profile or transaction profile. Certain types of audit entries related to information objects or data may be designated by the TRS to be included in an audit trail.

An "audit trail" is a collection of those audit entries which are designated by the TRS to be compiled into an individual computer record consisting of a sequential listing of events and activities with respect to information objects on the TRS, which record is digitally signed by the TRS to make such record tamper evident. When additional events or activities regarding an information object occur, and the related audit entries are designated by the TRS to be included in the audit trail, such additional audit entries are added sequentially to the existing record's audit entries, and the TRS applies a recursive wrapping digital signature to such aggregated audit entries. The audit trail represents a verifiable and authenticated record of information objects or data associated with a given document profile or transaction profile and the creation of, and important interactions with, such information objects or data, such as upload, transfer, destruction, or export of such information objects or data.

An "audit log" is an individual computer record of audit entries not designated by the TRS to be included in the audit trail, such as creation of a transaction profile or document profile, changes in the designated status of underlying information objects, access made to view such information objects, and upload of data fields not designated as "auditable" by the transaction owner, among others.

The TRS aggregates into a single repository transaction data from multiple sources, systems and involved stakeholders, in addition to information objects and documents from such multiple sources, systems and stakeholders involved in such transaction, and securely and reliably stores each such data, document or information object for its full effective life. This is accomplished with a novel approach to structuring data relationships that allows more effective access and management that is verifiable, including aggregation and analysis of data associated with a pre-existing transaction already maintained on the TRS.

The TRS gives transaction owners and certain transfer agents administrative rights to configure the TRS to allow data fields to be populated with respect to transaction profiles (allow each data Held to be populated with respect to any one or more transaction types) and/or to allow data fields to be populated with respect to document profiles (certain document types or all). These administrative rights include the choice of the type of data (e.g., text, numerical, etc.) and any validation of that data upon input, as well as whether the content of these data fields must be maintained in encrypted format, and whether these fields are "auditable" (i.e., digitally signed by the TRS to be tamper evident). The TRS sets a unique identifier for each data field (field ID) configured by the administrator to allow for tracking. Once the transfer agent configures the data fields, the transfer agent can then create transaction and document profiles to upload data into data fields the transfer agent has associated with such profiles. Another unique ID (data ID) is assigned by the TRS to the data field once it is populated with data.

Furthermore, the owner of the transaction information objects on the TRS is assigned a unique owner ID by the system, and each transaction profile and/or document profile created by that owner is associated with such owner ID. If a transfer agent creates a new transaction profile, a transaction ID is assigned to that profile and the appropriate owner ID is associated to that transaction ID. The transfer agent can populate data fields to be maintained in that transaction profile. Each such populated data field is then assigned a unique data ID for tracking, which is then associated by the TRS with the corresponding field ID and the transaction ID.

If the trailer agent chooses to add a document or information object to the transaction, or to add data at the document profile level of such transaction, the transfer agent creates at least one new document profile, a document ID is assigned to that profile, and the appropriate transaction ID is further associated with that unique document ID. Furthermore, each document or information object uploaded onto a document profile is assigned a unique version ID which is associated with the document ID of the document profile. The transfer agent can choose to add date, to a document profile, whether or not such profile also contains a document or information object, and the populated data fields are assigned data IDs which are associated with the corresponding field IDs and the document ID of the document profile.

The assigned IDs are hierarchical. The owner ID is the master level. Then transaction ID, document CD (if any), version ID (if any), field ID and data ID. This way the owner may allow other stakeholders, including transfer agents, to access their transaction profiles, and the underlying document profiles, and their respective contents, on the TRS for auditing or other purposes. The TRS maintains an association between the owner ID, transaction ID, document ID (if any), version ID (if any), field ID and data ID. This ensures that each unique data value is logically associated with not only the transaction profile and/or document profile to which it relates, but also to the owner of such data.

The administrative rights granted by the TRS with respect to each transaction also include a selection as to whether each of these data fields must be maintained in encrypted format, and whether each of these fields are "auditable" (i.e., digitally signed by the TRS and population of such field indicated in the audit trail). Upon completion of an upload of data by the transfer agent, if the transfer agent has designated each of such data fields as "auditable", the TRS applies a data and time stamp and digitally signs the set of data field values to seal it and make it tamper evident, and update the corresponding transaction profile or document profile audit logs of alternatively the corresponding transaction profile or document profile audit trail, or any data audit trail, as described in greater detail below, to reflect the population of each data field. Importantly, the TRS only updates the audit log (or, in some preferred embodiments, the audit trail) that the particular data fields were associated with—transaction, profile-level data uploads cause updates to the transaction audit log (or alternatively audit trail), and document profile-level data uploads cause updates to the document audit log tor alternatively audit trail). If an audit trail is updated, the TRS then applies a recursive wrapping digital signature and date and time stamp to make the updated audit trail tamper evident.

Subsequently, upon any request by a TRS user to interact with either the data, any document, or the related transaction profile or document profile, the digital signatures, on each dataset, the document (if any), and the related transaction and document level audit, trails (if present) are checked each time. This hierarchical structure of data management and storage enables data to be gathered, sealed as tamper evident, managed and analyzed across the entire transaction lifecycle or at any stage of the transaction; thereby guaranteeing the accuracy of the dataset at the time of upload onto the TRS and making such date available for accurate audit and review by stakeholders, potential transferee recipients of the underlying documents and information objects, regulatory authorities and other interested third parties.

After the TRS uploads and aggregates transaction data, documents and other information objects from stakeholders, the TRS preferably stores each dataset and original electronic information object by owner ID, transaction ID, document ID, version ID, field ID and data ID, and controls access to an account by user-type for the benefit of the account owner. The account owner specifies the set of activities that are permitted with respect to original electronic information objects stored in their account Multiple datasets and multiple document profiles (each document profile containing a dataset and/or an electronic document) may be assigned to a transaction ID. This way, each transaction ID is logically associated with everything involved in a given transaction, and everything associated with a given transaction ID may be viewed as a virtual folder. Furthermore, each owner ID is logically associated with every transaction profile stored in the TRS on behalf of such owner, and every transaction profile and its contents associated with a given account owner may be aggregated, analyzed, audited or reported or alerted on. The original electronic information objects are stored and the corresponding accounts are maintained by the TRS, which applies tamper seals to all original information objects in a transaction profile (e.g., any dataset of values in populated data fields designated as "auditable") and all original information objects in a document profile (documents and/or any dataset of values in populated data fields designated as "auditable"), thereby preventing direct modification of any such original information object as described above.

Additional embodiments of the present invention may be envisioned as follows:

If a document is uploaded onto the TRS for execution using the electronic signature functionality of the TRS, as described above, and the transfer agent elects to use the document field population functionality embedded within the electronic signature functionality of the TRS, the data provided by the document signer as part of the signing process may be uploaded by the TRS into either the same document profile as the document or into a new document profile in the same transaction, to populate the corresponding data fields.

If a document is uploaded onto the TRS for execution using the electronic signature functionality of the TRS and the document is a SMART Doc®, the data provided by the transfer agent as part of the upload process for population into the SMART Doc® may be uploaded by the TRS into either the same document profile as the SMART Doc® or into a new document profile in the same transaction, to populate the corresponding data field profiles, (A SMART Doc® is an electronic mortgage note created to conform to a specification standardized by the Mortgage Industry Standards Maintenance Organization, the voluntary standards development body for the mortgage industry.)

Optionally, once a document is fully executed on the TRS, or the document is uploaded onto the TRS in folly executed format, the TRS may scrape or use Optical Character Recognition (OCR) techniques to recognize the data contained in the document and upload such data into cither the same document profile as the document or into a new document profile in the same transaction, to populate the corresponding data fields.

Alternatively, once a document is fully executed on the TRS, or the document is uploaded onto the TRS in fully executed format, the TRS may scan for XMP meta-data contained in the document and upload such data elements into either the same document profile as the document or into a new document profile in the same transaction, to populate the corresponding data fields.

Data Authentication—Trusted Data

Once the transfer agent configures the data fields (using either the available TRS dashboard, described in greater detail below, or the TRS application program interfaces (APIs)), the transfer agent can request the TRS to upload data into the data fields from such transfer agent's systems, in addition to receiving data via document transfers. Upon receipt of data, the TRS associates each data field ID with the appropriate transaction ID (which has already been associated with the unique owner ID assigned by the TRS to the owner of such transaction profile) and/or document ID (which has already been associated with the related transaction ID), associates each data field value input by the user with the data field ID, and assigns each populated data field value with a unique data ID which is also associated with the appropriate transaction ID and/or document ID. The TRS encrypts the data field value, if encryption was configured by the stakeholder administrator for that data field. For those data fields that were configured as "auditable", the TRS digitally signs the set of data field values to seal it and make it tamper evident, and updates the applicable transaction profile or document profile audit trail (described below) to reflect the population of each data field. Once uploaded into the TRS, a data field value contained in a digitally signed dataset may not be changed or edited. Subsequently, upon any request by a TRS user to interact with either the populated "auditable" data fields or the related transaction profile or document profile, the digital signatures on each dataset the document (if any), and the related transaction profile and document profile audit traits are checked each time.

Moreover, the TRS formats the datasets such that they include suitable instructions for parsing and processing their contents. A convenient form of wrapper (e.g., PEM, RSA, PKCS #7, or S/MIME) or markup language (e.g., HTML, XML, or XFDL) can be used for this purpose. The contents can be one or more information, objects (each comprising one or more electronic documents, images, computer source code, computer executable code, databases, data compilations, etc.), date-time stamps, digital signatures and matching certificates, electronic signatures, and/or indicators, which include, but are not limited to, content types, object identifiers, and encoding rules and tags. In the case of those populated data fields designated as "auditable", the contents of the wrapper consist of the data values contained in such fields, the data fields themselves, and the TRS date and time stamp and digital signature. Each time additional populated data fields are added to an existing "auditable" dataset, the TRS combines the new populated fields with the existing digitally signed populated fields and applies a recursive wrapper over the package to provide signature and protection layering.

A primary value of the herein-described system lies in the system's ability to (1) accept documents and datasets associated with a given commercial transaction and maintain them as original, authenticated (as of date of acceptance by the TRS or independent authentication by a trusted third party system prior to receipt by the TRS) documents or datasets associated with the underlying transaction, wherein datasets that have been designated as "auditable" are maintained by the TRS as tamper-evident and reflect the data actually provided to the TRS or trusted third party at each stage of the transaction, and, in certain preferred embodiments, (2) to establish and maintain a verified, original audit trail or trails reflecting the custodial chain of ownership of said documents, and optionally datasets. This ensures the TRS at all times maintains as fixed the dataset relied upon to generate and populate those documents and information objects uploaded onto the TRS at that same time, even after the transfer of the documents and information objects to subsequent transferees, such that the original owner and subsequent owner may verity, monitor, analyze, audit and evaluate the information objects across the entire transaction of across multiple transactions across the entire transaction or across multiple transactions. Moreover, since remote records used as support documents in a transaction can be uploaded and so associated, so long as the TRS can upload an authenticated copy at the time the remote record is used, it too can be verifiably linked to the related transaction. This allows supporting information and documents traditionally well outside of any TRS to be included in the same transaction profile, or in document profiles under such transaction profile, such as data files of leads sold to lenders, and even electronic display ads used to generate those leads and the dates on which such display ads were run. This in turn greatly expands the scope of audits that can be conducted on such data, and fully consolidates the auditor or regulator's access to such data to one system, the TRS.

With respect to the first of these capabilities, as described elsewhere herein, the TRS is contractually bound by agreement between TRS and the owner(s) of the submitted documents or datasets to accept reliance on the TRS to serve as a repository vault and custodian of the original electronic information object representing either a dataset or a document. It is crucial that copies of an information object consisting of a document that exist outside of the control of a TRS must not be able to be mistaken for the original information object. An original information object may be effective as a blue-ink-signed paper document when one or more digital signatures are applied during deposit by relying on the TRS that reliably and securely stores original information objects for their full effective lives. By associating that authoritative original document with the authenticated dataset used to create such document, the invention allows for real-time auditing and analysis of the document and dataset by the originating owners, subsequent transferees and other stakeholders. It is also crucial that datasets uploaded to the TRS are able to be authenticated as exact, unmodified (since upload) versions of that dataset as existing at the time of upload of the corresponding authenticated document, as such dataset was relied upon by the originating system to generate and populate the corresponding authenticated document.

Accordingly, to submit an information object (used here to indicate either a dataset and/or a document) to the TRS, the transfer agent of the object's owner logs onto a secure web portal and enters its credentials (username and password and a designation for the account which the owner or the transfer agent is authorized to access) or such transfer agent directly provides its credentials to the TRS using the appropriate software API calls, and selects a transaction and/or document profile into which to place the information object according to the hierarchy described above. The TRS validates the transfer agent's credentials and rights to act on behalf of the information object's owner and, once it is determined that a transfer agent has the proper authorizations, the TRS permits the deposit of the information object file to the TRS.

The upload may be an electronically signed document or other information object from a third party electronic signing system (such as, for example, DocuSign® or Echo-Sign®) or from an intermediary third party storage system having received an electronically signed document or other Information object from a third party electronic signing system. In some eases the document may be unsigned, in which case a stakeholder can use the electronic signature functionality of the TRS to configure the document for electronic signature, send invitations to the signers to sign the document, and upon completion of signing, cause the TRS to append a date-time stamp and its digital signature and certificate to make the document tamper evident and send each signer and the stakeholder a marked copy of the folly executed and sealed document (as described in U.S. Pat. No. 8,924,302 to Bisbee et al., which is incorporated herein by reference). In some cases the information object may be a scan of a pen-and-ink signed document. The authorized transfer agent of the TRS may upload the digital electronic file representing the document and then, replace the pen-and-ink original with the upload as the authoritative copy. Regardless of how the information object is created, after foil execution the TRS has created an entry to hold the information object and maintains the signed information object in the entry, along with metadata and other information regarding this creation, execution, and history of the signed information object. In cases in which the information object was signed using means other than the electronic signature functionality of the TRS, the TRS has obtained a certification from the third party system as to the authenticity and uniqueness of the information object by verifying that the deposited information object is now the only authoritative and original copy. Successful authenticity attests to the legitimacy of the submitted information object. Regardless of how the document is created, upon completion of the upload or the execution of the document, the TRS has created the original authenticated information object by appending a date-time stamp and its digital signature and certificate. This TRS action establishes and demonstrates the TRS' assumption of control of the authentic, or the authenticated, original information object.

With respect to the present invention, the TRS is configured to additionally allow upload of data from the system of record which was used to create the document, or additional data and information from a third party system supporting or related to the electronically signed document, its origination, or its processing. The TRS creates an entry to hold the dataset as an information object, appends a date-time stamp and its digital signature and certificate to make the dataset tamper evident, and maintains the signed dataset as an information object in the entry. The TRS relates that entry with the entry containing the underlying executed information object and/or the transaction associated with such dataset. This TRS action establishes and demonstrates the TRS's assumption of control of the authentic, or the authenticated, original dataset, as associates that dataset with the transaction to which it relates.

Each of the information objects that may be originated or deposited, and otherwise maintained within, the TRS has a life which continues beyond the date of full execution or upload of the information object. Such information objects often themselves represent contractual obligations of parties which constitute assets owned by the stakeholder in "control" of such information object. A stakeholder may use the TRS to transfer an information object to another stakeholder, such as in a sale of the information object (as described in greater detail below). The TRS allows for such transfers among stakeholders of informal ion objects maintained within the TRS, allowing only the transferee access to the authoritative information object and its related audit trails alter completion of the transfer.

Accordingly, upon successful deposit of the information object file, the TRS may verify the integrity of the submitted information object. The TRS then automatically assumes custody and control of the information object submitted by that transfer agent and responsibility for such information object's preservation by assigning a unique system identifier to the submitted information object (either a data ID or a version ID as described above), flagging (attaching a tag to) the file, which designates it as properly received, and immediately placing a secure lock flag on the received information object file to ensure that no other action is taken during the submission process.

Where the uploaded information object is a document, or a dataset identified as "auditable" by the object's owner, the TRS then affixes the digital signature of the TRS to the submitted information object. The TRS's-digital signature tamper seals the now deposited information object using industry standard digital certificate technology. Preferably, the tamper seal is accomplished with an X.509 digital certificate, or its successor, issued by a certification authority to the TRS, The X.509 digital certificate associates the TRS identity with a public key value. More specifically, the certificate includes at least the TRS identity (the certificate owner), the public key associated with the TRS, X.509 version information, a serial number that uniquely identifies the certificate, the certification authority, the digital signature of the TRS, and information about the algorithm used to sign the digital signature. The digital signature applied by the TRS eliminates the possibility of unauthorized alteration or tampering with the information object subsequent to its original sealing.

Where a dataset identified as "auditable" are uploaded to a transaction profile or a document profile with an existing tamper sealed dataset, the TRS adds the newly-tamper-sealed dataset to the existing tamper sealed dataset, and applies a recursive wrapping digital signature to the aggregated dataset.

In a similar, way, the audit log for the appropriate level to which the document(s) and/or dataset(s) were added is updated and tamper sealed as described below.

Audit Trail

Some embodiments of the present invention include the creation of an audit trail, as defined above. Every action taken on the TRS with respect to an original electronic information object consisting of a document, every change in ownership, control, location, or otherwise, is logged to the document profile audit trail associated therewith for secure audit, record tracking and management, and backup functions are further provided by the TRS. These audit trails are also tamper sealed by the TRS upon each update to the audit trail, thereby preventing direct modification of any entry in the audit trails. With respect to original electronic information, objects consisting of populated data fields designated as "auditable", the TRS may be optionally configured to also log to the proper audit trail every action taken on the TRS with respect to such dataset, every change in ownership, control, location, or otherwise, for secure audit, record tracking and management.

Importantly, the TRS maintains at least one distinct level of audit trail: a document profile-level audit trail. In certain embodiments of the present invention, this document profile-level audit trail is updated by the TRS to log audit entries related to data fields maintained at the document profile level to provide additional recordkeeping and information regarding events occurring on the TRS with respect to such data fields. Moreover, a second separate audit trait may exist at the transaction profile-level to log audit entries related to data fields maintained at the transaction profile level. In other embodiments of the present invention a distinct audit log may exist to contain audit entries for all data for a given transaction, whether managed at the transaction profile or document profile level, and separate from either any transaction profile-level audit trail or the document profile-level audit trail.

If one or more audit trails are used in connection with the management of data on the TRS, the levels of audit trail correspond to the association of defined data fields at the transaction profile-level or document profile-level, or at the aggregate across all data managed within a transaction. This way, upon completion of the data upload by the user, the TRS digitally signs the set of "auditable" data field, values to seal it and make it tamper-evident, and updates the transaction profile audit trail and/or document profile audit trail (and/or data audit trail) to reflect the population of each such data field. The TRS only updates the audit trail that the particular data fields were associated with—transaction profile-level data uploads cause updates to the transaction profile-level audit trail, and document profile-level date uploads cause updates to the document profile-level audit trail, and if a single data audit trail is used, that audit trail is updated upon any action taken with respect to data maintained at any level in a given transaction.

Given the foregoing construct, if the TRS is configured to manage data using audit trails, every authenticated uploaded dataset and information object has one verifiable audit trail associated with it. The conditions under which this is accomplished allow the TRS to provide a verifiable chain of evidence throughout an entire electronic transaction, from lead generation through securitization, and involving creation of multiple authenticated original information objects in digital formats.

Since the TRS compiles and maintains control over every audit trail through the use of tamper seals, the entire transaction profile audit trail and/or document profile audit trail (and/or data audit trail) can be verified, regardless of how complex they are.

Data Transfer

With respect to transfers of documents, a transfer agent on behalf of the transaction owner can designate whether and which data fields will be transferred with a document and/or group of documents associated with a given transaction profile). The transfer agent for the transferor may configure the transferor portion of the TRS to offer for transfer any one or more of the transferor's data fields along with transfer of the associated documents.

The transfer agent for the transferee may configure the transferee's portion of the TRS to receive from the transferor data values residing in the offered transferor data fields, and populate the data fields maintained by the transferee with the data from the data fields managed by the transferor and the appropriate level, transaction, profile or document profile, at which to import the values for such data fields upon accepting a transfer from the transferor. Upon acceptance of such a data transfer, the transferee's data-Held characteristics are applied to the received data values.

For example, the transferor may wish to transfer data values from the transferor's document profile-level data fields named SocSecNo and DOB but the transferee may wish to import the values into the transferee's transaction profile-level data fields named SSN and Birthdate. If the transferee has associated a transferor's transition profile-level data field of SSN, "auditable" and encrypted, with the transferee's document profile-level data field of SocSecNo, not auditable and encrypted, from the date of transfer, the data field will be known as SocSecNo, the data value therein shall be maintained by the TRS in encrypted format, accessible only to the transferee owner, the data value will not be included in the dataset digitally signed and date-time stamped by the TRS to be tamper evident, and no audit trail will be updated to reflect receipt of such data field from the transferor (if the TRS was configured to update audit trails with data-related audit entries). Alternatively, the transferee may not wish to accept, certain data fields at all.

The mapping of data fields across transferor and transferee owners for transfer of data allows ease of reference and management by the transferee in a form and forma t recognized by the transferee and its systems. It further enables the transferee to apply its own hierarchical structure of data management and storage, as well as making tamper evident those data fields relevant to transferee's use of such data, to ensure accuracy of the data is maintained after transfer for audit and review by transferee stakeholders, future transferee recipients of the underlying data and assets, regulatory authorities and other interested third parties.

The TRS will not allow transfers of data without a corresponding transfer or one or more documents (i.e., no transfers can be directly performed solely on transaction profiles and/or document profiles that only contain data). However, the transferor transfer agent can still choose to send data fields from such a document profile along with transfer of a document under a separate document profile in the same transaction profile.

As an added feature of the invention, in certain embodiments, the transferee owner of the transferred data may upload a separate dataset to the TRS for comparison to the dataset maintained by the TRS, and the TRS may provide functionality for comparing the separate dataset to data values contained within the dataset pending transfer. The TRS may then produce a report which indicates any discrepancies between the two datasets to allow the transferee of the data to either accept or reject one or more values of the dataset and/or documents pending transfer.

In additional embodiments of the present invention, where system-to-system API calls are used to transfer data, a transferee transfer agent may configure automated delivery to a transferee system of copies of the documents pending transfer and a copy of the values of the data fields pending transfer. This allows the transferee to compare copies of such documents and data outside of the TRS to data and documents outside of the TRS to determine whether to accept all or any portion of the pending transfer on the TRS.

Analysis and Notifications

Access to, and notifications and alerts regarding, the data and/or the documents may be managed via system-to-system API calls or by the secure TRS dashboard. The TRS dashboard also offers options for data analysis, with relevant analytics, monitoring, and reporting functionality. The TRS dashboard provides users secure access to authoritative copies of documents and authenticated data, including access to the corresponding audit trails and audit logs. In addition, the TRS dashboard includes real-time analytics and monitoring with threshold-based alerts and drill-down capability to any level of the data or documents. The TRS dashboard includes a visual interface for building audit rule sets to examine the uploaded datasets and the electronic documents for compliance with legal and regulatory requirements.

The TRS (whether via the dashboard or APIs) can also be configured to send alerts, for instance via email or soap system-to-system messages, based on either upload of data or data comparisons or statuses. An example of such an alert could be triggered when a data field value is subsequently uploaded onto the TRS which value differs from the data field value already on the TRS for the same data field ID in the same transaction. Thus, these programmable alerts can be used to notify stakeholders of fluctuations in data field values over time within a given transaction or to notify stakeholders of fluctuations in ranges of data field values over time across multiple transactions.

FIGS. 2-7 illustrate dashboard functionality provided by the TRS. All but the "infographics" screen of dashboard functionality is also available to users through TRS APIs; however the dashboard screenshots are discussed here for ease of illustration.

Figure 2:
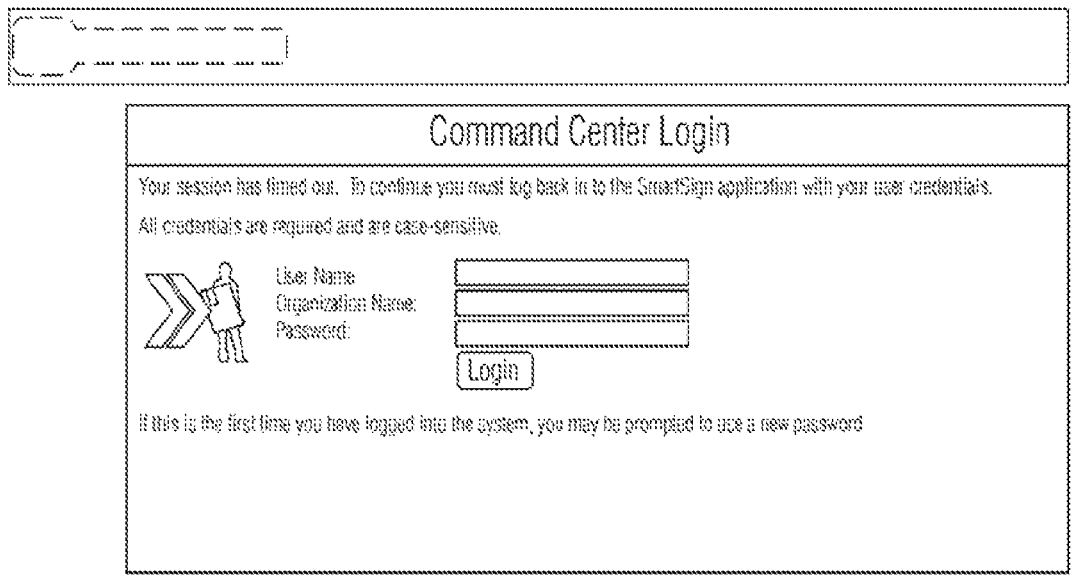
FIG. 2 is a screen shot of the dashboard login screen.

FIG. 2 is a screen shot of the login screen which solicits three identifiers: 1) user name; 2) organization name; and 3) password. These identifiers are used in a hierarchical permissions scheme that includes administrator and individual user permissions. The participants are given selective access, based on the permissions scheme, to all or a portion of the documents and data elements maintained on the TRS.

Figure 3:
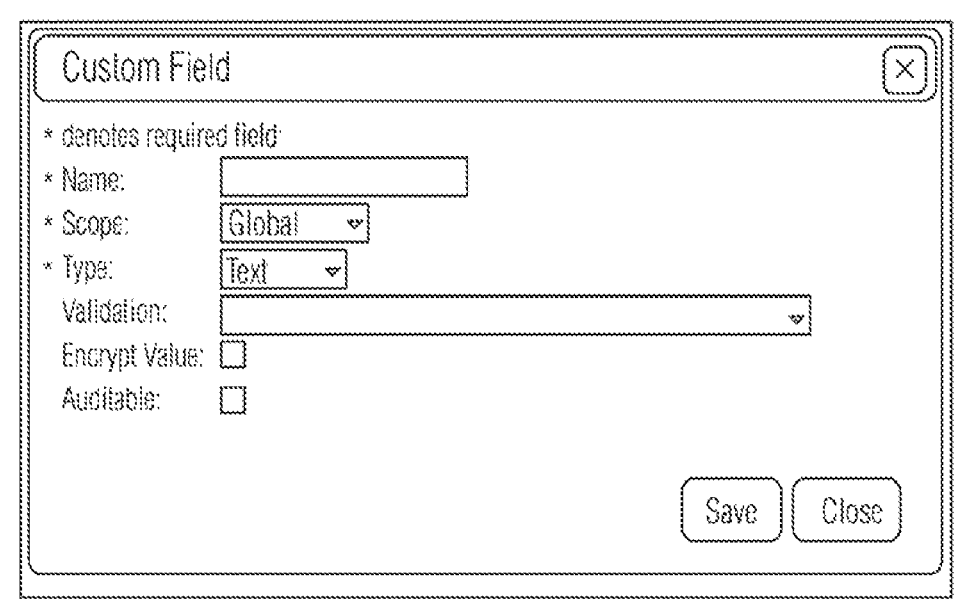

FIG. 3 is a screen, shot of the custom field screen which allows the user to configure data fields. The user can easily add new data fields by naming them and defining their-scope (transaction profile or document profile or global—either transaction profile or document profile), type (text, number, etc.), "auditable", encryption value, and any input validation parameters applicable to such field. Once the user clicks "save" the TRS assigns a field ID to the configured data field for management. The fundamental data structure in the present system is a data element, which is defined by scope (either transaction profile-level, document profile-level or both "global"), and type (alphanumeric, numeric only, true/false, date, etc.). A field is a physical unit of storage in a record. Thus, for example, the present system may have a record (a dataset) including different fields tor different types of information such as buyer, seller, asset, sale price, date, etc. The present system relies on custom data fields by which an administrator can define a multiplicity of data fields plus field-dependent attributes and actions to allow data comparison among similar fields across a transaction and across multiple transactions.

An administrator can set field-dependent logical actions for any defined custom data field. Using other functionalities of the system, the administrator can define parameters such as "When" the custom field ("AppCreditScore") is greater than some <Value>, automatically email-copy the following recipients ("To:, cc:, Bcc"), This functionality allows programming of alerts, by which the TRS sends notifications/alerts to users. For example, if a defined rule determines that a borrower has artificially lowered his debt-to-income ratio, which is a key underwriting criterion used to determine eligibility for most mortgage loans, or if there is: an error in a lender/servicer's data such that such data does not conform to the data for such field existing in the TRS, the system may send an e-mail (or system-to-system SOAP message, automated telephone call, and so on) to the approving bank or loan processor.

Given the above-described flexibility in defining custom data fields which may be tamper sealed from upload and field-dependent actions, the TRS combines two novel attributes to produce a synergistic result; an audit capability far more comprehensive than previously possible. First, for "comprehensive data collection", every participant in the entire process of lead generation, loan origination, aggregation, pooling and collateralization or securitization, etc., and ail interested third-parties, are assigned a portal by which they can, via the Internet either from their workstation such as a laptop 101, PDA 105 or desktop machine (FIG. 1) or via system-to-system API integration, upload documents and data to the TRS and access documents and data on the TRS. Second, for "comprehensive data correlation" the TRS employs logical association to match the data and documents associated with the varying stages of a transaction to track individual field values and permit aggregation and analysis. Third, for "comprehensive data authentication" the TRS receives both the data and the documents prepared based on such data from the same systems, and applies the TRS's digital signature to each such that the data and documents become tamper evident from the time of upload. Fourth, in some embodiments, for "comprehensive data maintenance" the TRS initiates and maintains audit logs and audit trails establishing a verifiable comprehensive event record for the entire transaction.

More specifically, for comprehensive data authentication all original information objects, including documents and data configured as "auditable", from each third party system created during any stage of a transaction are deposited with the TRS as an authoritative copy, and are maintained by the TRS and, in some embodiments, related audit trails are created to document such deposits evidencing the authenticity and unalterability of such deposits from time of upload. Thus, lead generators and resellers may upload any stakeholder acquisition information, including online advertisements, emails, email attachments, etc. Financial institutions, including banks and investment banks involved in securitization, may upload lending criteria. Each participant does likewise through the APIs or the TRS dashboard pursuant to permissions. Alternatively the stakeholder in receipt of such information and relying upon such information from another stakeholder, may upload such information onto the TRS. In total this provides the TRS with an authoritative copy of each set of "auditable" data elements and each transaction document, allowing the TRS at each stage to compile and maintain audit entries in the corresponding audit trails. The TRS affixes the current date and time to each set of "auditable" data elements, applies its digital signature, and the time-stamped dataset is then vaulted by the TRS and can be later accessed. The TRS then may update the audit trails with additional events as they occur.

Figure 4:
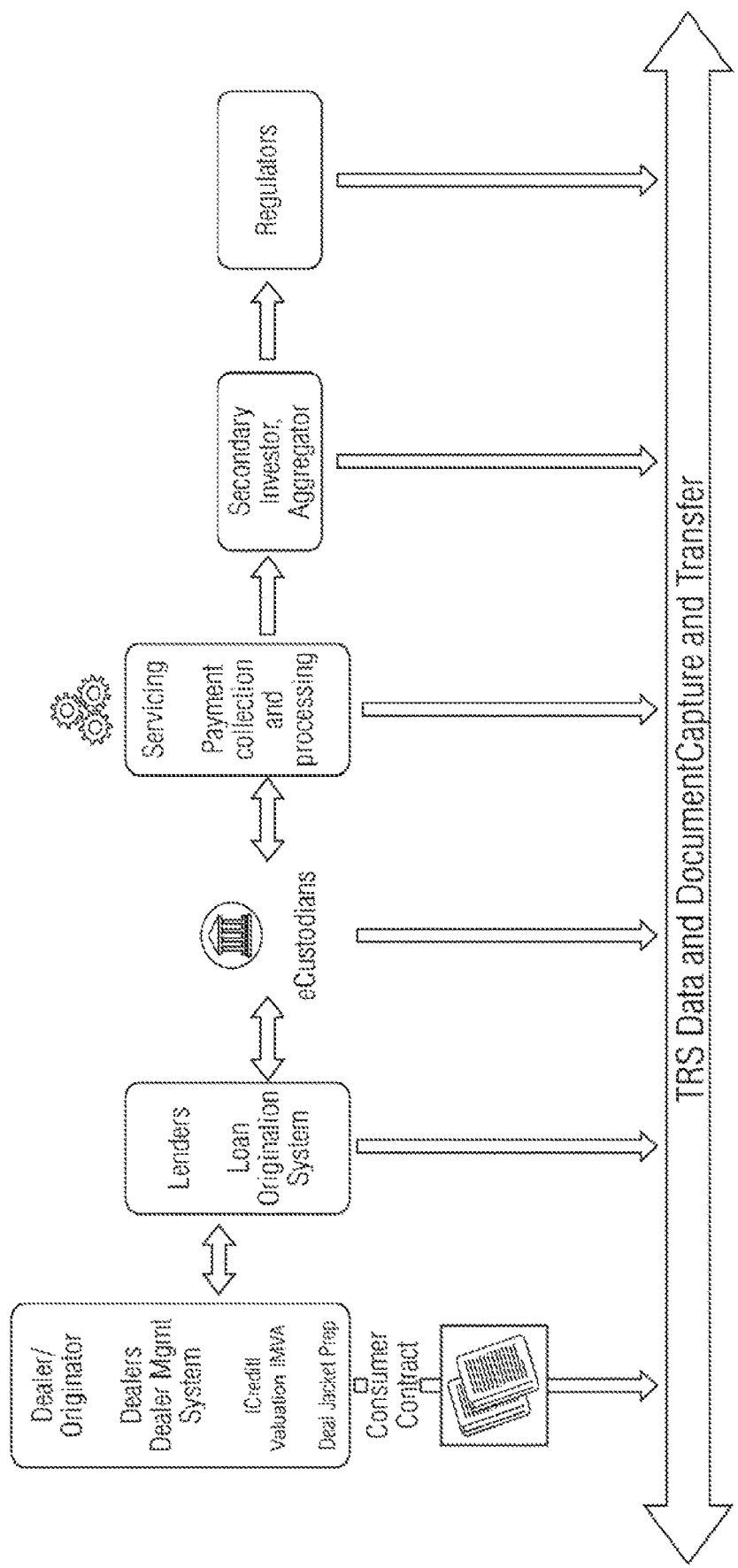
FIG. 4 is a flow chart illustrating the date acquisition and access process of the invention across multiple relevant stakeholders.

FIG. 4 is a flow chart illustrating the comprehensive data collection and access process of the invention. Each participant from start-to-finish during the entire process interfaces with the TRS, including lead generators, brokers, lenders, banks, etc. At each juncture there is an initial deposit of authoritative information with the TRS. This could, entail uploading an electronically signed document from a third party system and depositing it with the TRS as an authoritative copy, along with information regarding the creation, origination and execution of the document which, is uploaded into the same document profile under the same transaction profile. At each point the TRS updates each document profile-level audit trail to reflect the upload. Alternatively this could entail using the electronic signature functionality of the TRS for execution of an unsigned copy of the document at any stage of a transaction (loan application, loan, closing, transfer/purchase agreement, etc.), during which the TRS populates the document profile audit trail with information regarding the document's origination and execution (e.g., signer names, email addresses, date and time of signing, etc.). The initial deposit can also include data which was used to populate the uploaded documents or from which the uploaded documents were generated.

The TRS employs digitally sealed datasets and related documents, allows and structures transfers of such datasets with transfers of related documents, and maintains complete audit trails showing all document upload, and transfers, exports and destruction of all such documents (and of such data in certain embodiments). This builds a complete history of each transaction from before creation of the transferred asset and through the remaining lifecycle of the asset.

Furthermore, the TRS allows the purchaser of a given asset tor the regulator of that purchaser) to drill down into the data underlying the entire history of such asset such as, for example, a lead aggregator's data associated with that asset (provided that such data has been uploaded to the TRS upon or prior to the asset's origination). In this way, auditors and/or regulators viewing the security end of the transaction can follow the transaction back to the beginning (lead generation) for purposes of Investigating false advertising or the like which resulted in the creation of the transferred asset. Moreover, given the TRS chain of trust as evidenced in the related audit trails, the authenticity of each document and, in certain embodiments the authenticity of each "auditable" dataset, from start to finish is assured. The documents, data and audit trails are made selectively available (depending on user permissions) to participants and regulators via the TRS dashboard, or via API integration with the TRS. Thus, for example, if the user of an authorized stakeholder has access to a given document type, the stakeholder also has access to the audit logs and audit trails related to document profiles containing a document and/or data of such document type, the transaction profiles in which document, profiles reside, all data contained in such transaction profiles and any transaction-level audit log. The permissions may specify that a stakeholder is precluded from viewing certain transaction types or document types, and even certain data fields within a given transaction profile or any document profile within such transaction profile Stakeholders or regulators can follow the audit trails from the securitization end back to the beginning (lead generation) and view all documents and/or uploaded "auditable" data as they existed at the time of upload for purposes of investigating false advertising or the like, and can view all actions taken over the entire transaction through one single system, the TRS (rather than contacting all involved parties separately). The efficiency, comprehensiveness and trustworthiness of the audit process is unique.

Figure 5:
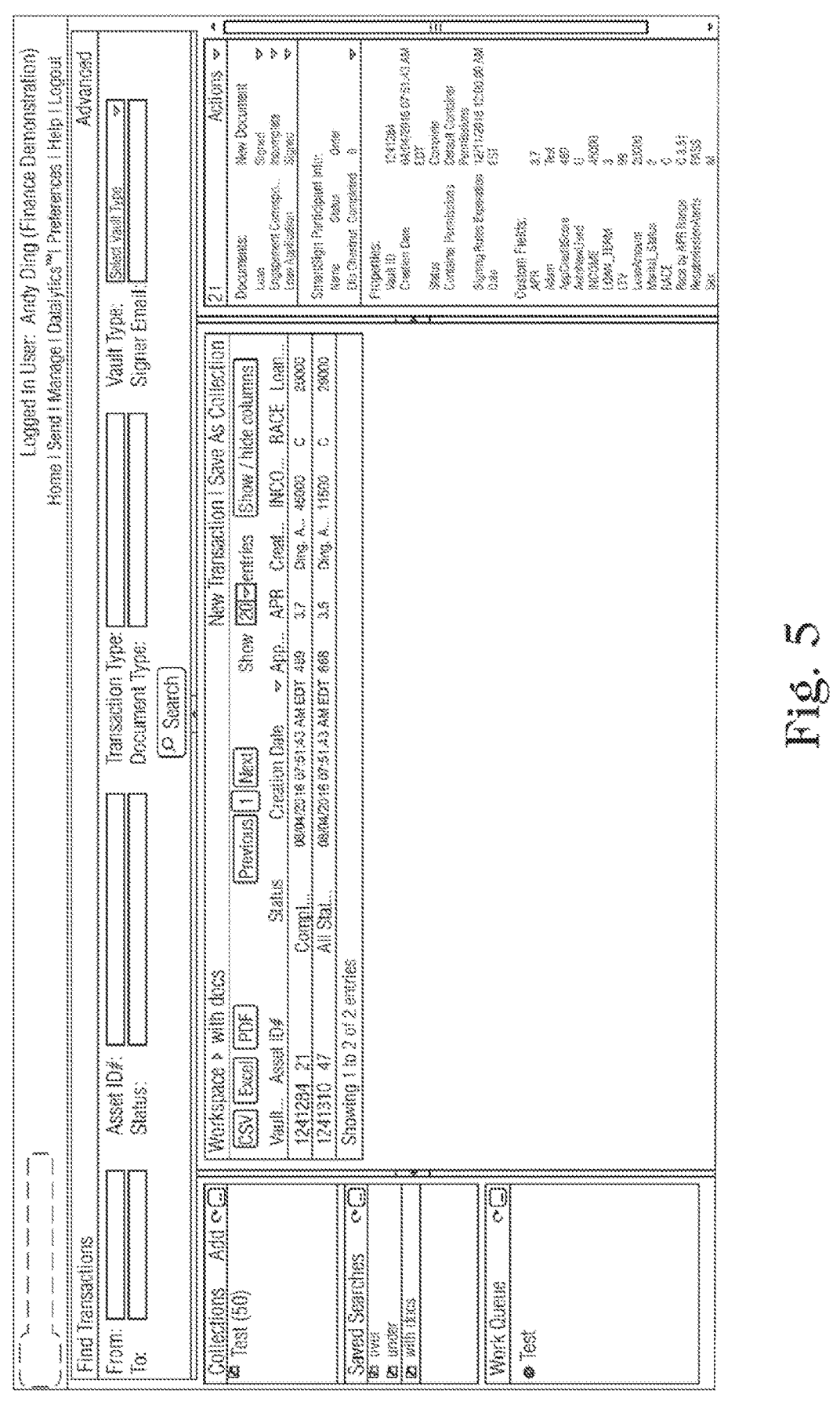

FIG. 5 is a screen shot of the dashboard transaction profile search screen. The search screen allows the user to develop a query by which a user can find one or more transaction profiles matching specified criteria. FIG. 5 is a screen shot of the transaction profile search results screen showing two matching transaction profiles. Any or all of the filtered transaction profiles can be highlighted/selected. In FIG. 5, the transaction profile for Asset ID #21 is highlighted and displayed. Further, using die search screen, the user can group transactions and derive global metrics by selecting more of the transactions in FIG. 5 for analysis (see FIG. 7). Further, the dashboard functionality provides drill-down capabilities. Thus, if the transaction profile involving Asset ID #21 is selected and clicked, the transaction, profile properties are displayed (as shown in FIG. 5) and the transaction profile-level data and the document profiles contained within such transaction profile are presented. The user can click any of such profiles to view their related audit trails an d audit logs, the document (if any) in such document profiles, or the data (if any) in such document profiles. If the electronic signature functionality of the TRS was used to execute a document in any such document profile, information regarding the signers is also presented.

Figure 6:
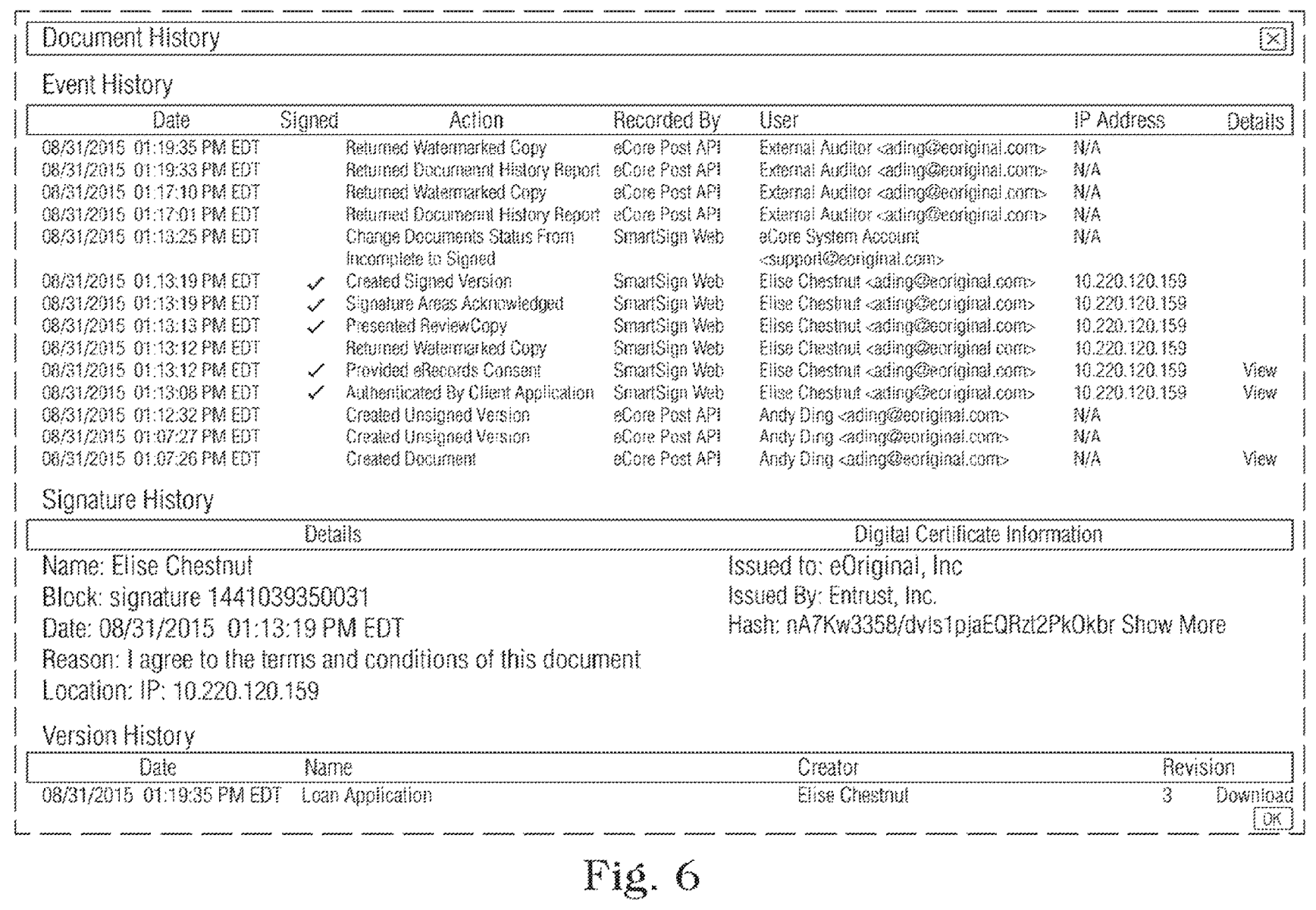

FIG. 6 is a screen shot of the document profile-level audit log and audit trail for the document profile entitled "Loan" in the transaction profile Asset ID #21. The screen Is broken into three sections: Event History (top); Signature History (middle) and Version History (bottom). In the Event History every relevant action taken is displayed in chronological format. If there are additional detail s associated with an.

Event to vie w the user can click on a "view" link and view the details in the sections below. Those Events indicated as "Signed" comprise the audit trail of such document profile. The remaining Events comprise the audit log. If the electronic signature functionality of the TRS was used to execute a document in the document profile, the Signature History provides information regarding the signer of the document contained in the document profile, as well as information regarding the TRS's digital certificate used to tamper seal such document. Additionally, the user can click in the "download" link under the Version History portion of the screen to view the current document version maintained in the TRS.

Figure 7:
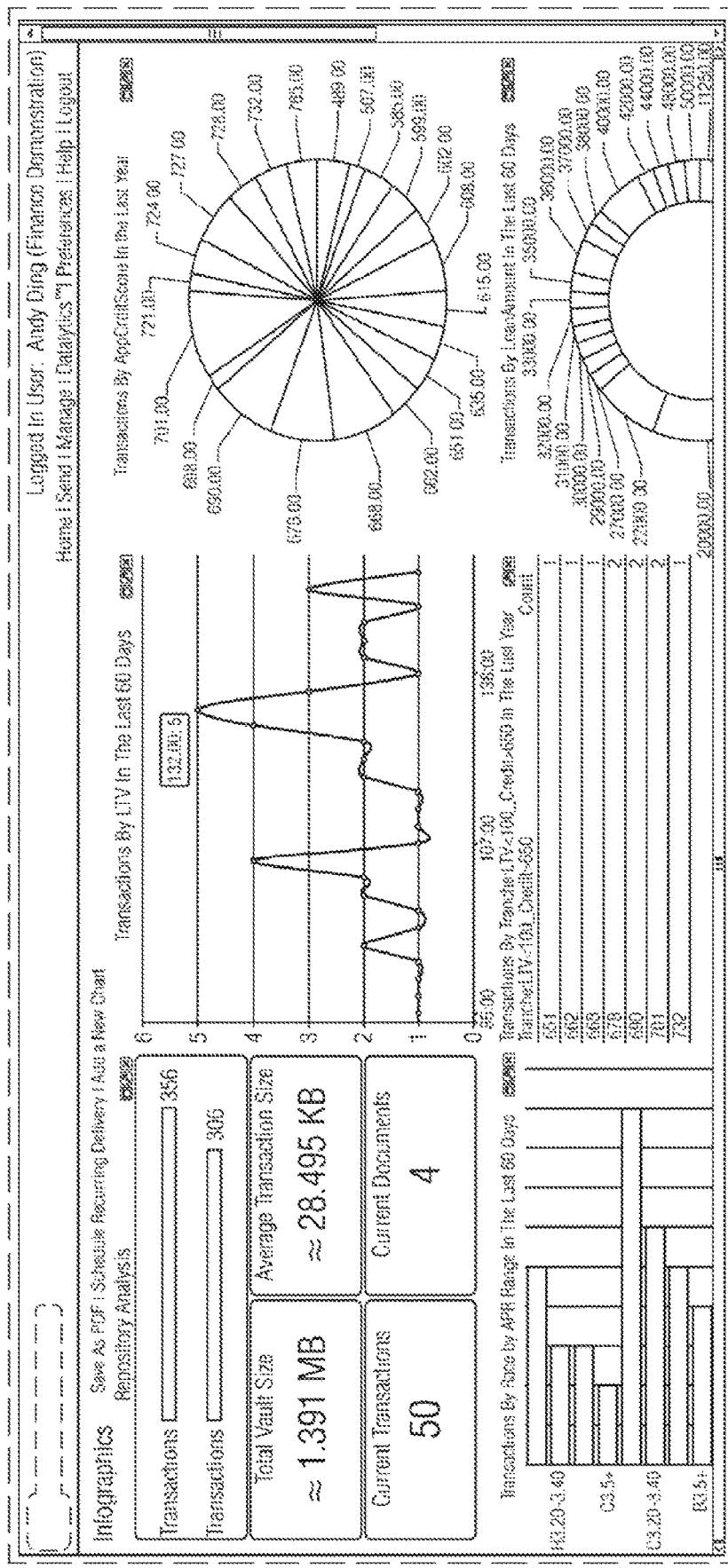
FIG. 7 is a screen shot of the configurable Infographics screen of the dashboard.

FIG. 7 is a screen shot of a sample Infographics screen graphically displaying the metrics derived from fifty filtered transactions which had been selected using the transaction search screen functionality displayed in FIG. 5. The metrics allow the user to visualize and monitor their any number of key performance indicators related to transaction profiles of such account owner, such as loan-to-value ratio, and key risk indicators, and the user again can drill into the underlying data for deeper analysis. The metrics are configurable by the user. Thus, for example, an account owner may configure this screen to display any of a wide variety of graphic metrics based upon any search criteria and terms set by the account owner.

The metrics may provide a reason for a further drill down to took at data or documents uploaded at any stage of the transaction, for instance uploads from the system of engagement such as a web-based loan calculation that the borrower used which prompted a dealer salesperson chat that resulted in the contract. This provides a "real-time" audit capability.

It should now be apparent that the above-described invention provides a real-time robust asset-level auditing and compliance solution that allows users to quickly respond to audit requests and prevent emirs and resubmissions. The system effectively provides real-time audit capability with global metrics tor complete transactions, from lead generation, loan origination and through, securitization, and preserves drill-down capability to asset-level detail even after bundling and transfer of such assets. The foregoing is accomplished through a single interlace to all of the data and documents residing in one place, the TRS, and it fully preserves the chain of trust established by the TRS. The system may be used in a variety of contexts, not limited to the commercial transactions described herein, such as to aggregate and audit data for clinical trials, or the like.

The above-described embodiment is for the purpose of promoting an undemanding of the principles of the invention. It should nevertheless be understood that no limitation of the scope of the invention is thereby intended, such alternations and further modifications in the illustrated device, and such further applications of the principles of the invention as illustrated herein being contemplated as would normally occur to one skilled in the art to which the invention relates.

STATEMENT OF INDUSTRIAL APPLICABILITY

The continuing evolution of methods of commerce is evident in the increasing replacement of paper-based communications and transactions with electronic communications and transactions. Moreover, modern commercial transactions may include the col lection of data or datasets during, loan origination, third-party data collection, underwriting, collateralization, and securitization, which each entail multiple participants, each generating, delivering and receiving multiple datasets, as wells as the many electronic documents and other information objects related to such transaction process. Mistakes, false advertising, and loan fraud keep regulators busy, and the U.S. maintains separate securities, commodities, and insurance regulatory agencies, as well as bank regulatory agencies, both at the Federal and state level to combat these problems. Therefore, there would be great industrial applicability in a software-based method and system for maintaining electronic documents and datasets associated with a given commercial transaction as original, authenticated documents or datasets associated with the underlying transaction.

We claim:

1. In a data processing system that includes at least one remote computer workstation, that is connected via a communications network to at least one trusted repository system including at least one application server and at least one secure database management system, a method of providing authenticated transaction data comprising the steps of:

establishing, by said trusted repository system, a transaction profile specifying options and settings for all transactions associated with a particular transaction type;

assigning, by said trusted repository system, a transaction identifier to said transaction profile;

establishing, by said trusted repository system, one or more data fields corresponding to said transaction profile;

establishing, by said trusted repository system, a document profile specifying options and settings for all documents associated with a particular document type;

assigning, by said trusted repository system, a document identifier to said document profile;

establishing, by said trusted repository system, one or more data fields corresponding to said document profile;

logically associating, by said trusted repository system, said document identifier to said transaction identifier;

receiving, by said trusted repository system, instructions from said authorized user designating at least one of said one or more data fields as auditable;

assigning, by said trusted repository system, a field identifier to each of said one or more data fields;

logically associating, by said trusted repository system, said field identifiers with said transaction identifier;

receiving, by said trusted repository system, one or more first information objects from an authenticated transfer agent at one of said at least one remote computer workstation via said communications network;

depositing, by said trusted repository system, each of said first information objects into one of said data fields;

assigning, by said trusted repository system, an information object identifier to each said first information object;

logically associating, by said trusted repository system, said information object identifiers with said field identifiers;

applying a digital signature and date-time stamp to such first information objects; and storing, by said trusted repository system, said first information objects in said secure database management system.

2. The method of claim 1, further comprising:

receiving, by said trusted repository system, an instruction from an authorized user to open said transaction profile;

verifying, by the trusted repository system, said digital signature and date-time stamp applied to said first information objects;

receiving, by said trusted repository system via said communications network, one or more second information objects from said authorized user at one of said at least one remote computer workstation;

depositing, by said trusted repository system, said second information objects into at least one of said one or more data fields;

assigning, by said trusted repository system, an information object identifier to each of said second information objects;

logically associating, by said trusted repository system, each of said information object identifiers with one of said field identifiers;

adding, by the trusted repository system, said second information objects to said digitally signed and date-stamped first information objects housed in said secure database management system to generate an aggregated dataset;

applying, by the trusted repository system, a recursive wrapping digital signature and date-time stamp to said aggregated dataset; and storing, by said trusted repository system, said aggregated dataset in said secure database management system.

3. The method of claim 1, wherein:

said step of establishing, by said trusted repository system, a transaction profile further comprises establishing, by said trusted repository system, a transaction level audit trail corresponding to said transaction profile; and wherein said step of storing said one or more first information objects in said secure database management system further comprises updating said transaction level audit trail after said receiving, verifying, receiving, assigning and storing steps with a one or more entries corresponding thereto and applying, by the trusted repository system, a digital signature and date-time stamp to said updated transaction level audit trail.

4. The method of claim 1, wherein:

said step of establishing, by said trusted repository system, a transaction profile further comprises establishing, by said trusted repository system, a data audit trail corresponding to said transaction profile; and wherein said step of storing said information object in said secure database management system further comprises updating said data audit trail after said receiving, verifying, receiving, assigning and storing steps with one or more entries corresponding thereto and applying, by the trusted repository system, a digital signature and date-time stamp to said updated data audit trail.

5. In a data processing system that includes at least one remote computer workstation, that is connected via a communications network to at least one trusted repository system including at least one application server and at least one secure database management system, a method of providing authenticated transaction data comprising the steps of:

establishing, by said trusted repository system, a transaction profile specifying options and settings for all transactions associated with a particular transaction type;

assigning, by said trusted repository system, a transaction identifier to said transaction profile;

establishing, by said trusted repository system, a document profile specifying options and settings for all transactions associated with a particular document type;

assigning, by said trusted repository system, a document identifier to said document profile;

logically associating, by said trusted repository system, said document identifier to said transaction identifier;

establishing, by said trusted repository system, one or more data fields corresponding to said document profile;

receiving, by said trusted repository system, instructions from an authorized user at said at least one remote computer workstation designating at least one of said one or more data fields as auditable;

assigning, by said trusted repository system, a field identifier to each of said one or more data fields;

logically associating, by said trusted repository system, said field identifiers with said document identifier;

receiving, by said trusted repository system via said communications network, one or more first information objects from an authenticated transfer agent at one of said at least one remote computer workstation via said communications network;

depositing, by said trusted repository system, each of said first information objects into one of said data fields;

assigning, by said trusted repository system, an information object identifier to each said first information objects;

logically associating, by said trusted repository system, said information object identifiers with one or more of said field identifiers;

applying a digital signature and date-time stamp to such first information objects; and storing, by said trusted repository system, said first information objects in said secure database management system.

6. The method of claim 5, further comprising:

receiving, by said trusted repository system, an instruction from said authorized user to open said document profile;

verifying, by the trusted repository system, the digital signature and date-time stamp applied to said first information objects;

receiving, by said trusted repository system via said communications network, one or more second information objects from said authorized user at one of said at least one remote computer workstations;

depositing, by said trusted repository system, each of said second information objects into at least one of said one or more data fields;

assigning, by said trusted repository system, an information object identifier to each of said second information objects;

logically associating, by said trusted repository system, each of said information object identifiers with one of said field identifiers;

adding, by the trusted repository system, said one or more second information objects to said digitally signed and date-stamped first information objects to generate an aggregated dataset;

applying, by the trusted repository system, a recursive wrapping digital signature and date-time stamp to said aggregated dataset; and storing, by said trusted repository system, said aggregated dataset in said secure database management system.

7. The method of claim 5, wherein:
said step of establishing, by said trusted repository system, a document profile further comprises establishing, by said trusted repository system, a document level audit trail corresponding to said document profile; and
said step of storing said information object in said secure database management system further comprises updating said document level audit trail after said receiving, verifying, receiving, assigning and storing steps with one or more entries corresponding thereto and applying, by the trusted repository system, a digital signature and date-time stamp to said updated document level audit trail.

8. The method of claim 5, wherein:
said step of establishing, by said trusted repository system, a document profile further comprises establishing, by said trusted repository system, a data audit trail corresponding to said transaction profile; and
said step of storing said information object in said secure database management system further comprises updating said data audit trail after said receiving, verifying, receiving, assigning and storing steps with one or more entries corresponding thereto and applying, by the trusted repository system, a digital signature and date-time stamp to said updated data audit trail.

9. The method of claim 5, further comprising the steps of:
receiving, by said trusted repository system, a request by said authorized user to open said document profile;
verifying, by the trusted repository system, the digital signature and date-time stamp applied to said first information objects;
receiving, by said trusted repository system from said authorized user, a request to upload a document to said document profile;
establishing, by said trusted repository system, a document level audit trail corresponding to said document profile;
receiving, by said trusted repository system, said document from an authenticated transfer agent at one of said at least one remote computer workstation via said communications network;
assigning, by said trusted repository system, a version identifier to said document;
logically associating, by said trusted repository system, said version identifier to said document identifier;
applying, by the trusted repository system, a tamper seal comprising a digital signature and date-time stamp to said document;
storing, by said trusted repository system, said document in said secure database management system; and
updating, by said trusted repository system, said document level audit trail after said receiving, verifying, receiving, assigning and storing steps with one or more entries corresponding thereto and applying, by said trusted repository system, a digital signature and date-time stamp to said updated document level audit trail.

10. The method of claim 7, wherein said step of verifying a digital signature and date-time stamp applied to said first information objects further comprises verifying said digital signature and date-time stamp applied to said document level audit trail.

11. The method of claim 9, wherein said step of verifying the digital signature and date-time stamp applied to said information object further comprises verifying said digital signature and date-time stamp applied to said document.

12. The method of claim 7, wherein said step of verifying said digital signature and date-time stamp applied to said first information objects comprises verifying a digital signature applied to any existing first information objects associated with said transaction profile associated with said document profile and any existing transaction level audit trail.

13. The method of claim 8, wherein said step of verifying a digital signature and date-time stamp applied to said information object further comprises verifying a digital signature applied to said data audit trail.

14. The method of claim 9, further comprising, prior to said step of storing said document:
receiving, by said trusted repository system from said authorized user, a request to electronically sign said tamper sealed document associated with said document profile;
creating, by said trusted repository system, a copy of said tamper sealed document and verifying by said trusted repository system the integrity of said copy by validating said tamper seal;
marking by said trusted repository system said copy with a forgery-resistant indicia identifying said copy as a copy of said document held at said trusted repository system;
communicating by said trusted repository system said marked copy of said document to said authenticated local user at said remote computer workstation via said communications network;
applying by said authenticated user via said remote computer workstation an electronic signature to said marked copy of said document;
communicating by said remote computer workstation said electronic signature to said trusted repository system via said communications network;
applying by said trusted repository system said electronic signature to said tamper sealed document;
applying, by the trusted repository system, a digital signature and date-time stamp to said document with its applied electronic signature, whereby said document is designated an original electronic document by said trusted repository system;
assigning, by said trusted repository system, a version identifier to said original electronic document;
logically associating, by said trusted repository system, said version identifier with said document identifier; and
updating, by said trusted repository system, said document level audit trail after said applying and assigning steps with one or more entries corresponding thereto and applying, by said trusted repository system, a digital signature and date-time stamp to said updated document level audit trail.

15. In a data processing system that includes at least two remote computer workstation, both connected via a communications network to at least one trusted repository system consisting of at least one application server and at least one secure database management system, a method of compiling and transferring verifiable transaction data comprising the steps of:
establishing, by said trusted repository system, a transaction profile specifying options and settings for all transactions associated with a particular transaction type;
establishing, by said trusted repository system, a document profile specifying options and settings for all documents associated with a particular document type;

receiving, by said trusted repository system, a request from a first authorized user at a first remote computer workstation to transfer data related to said transaction profile;

compiling, by said trusted repository system, tamper sealed data logically associated with said transaction profile;

verifying, by said trusted repository system, said tamper sealed audit trail associated with said transaction profile;

receiving, by said trusted repository system, a request from a second authorized user at a second remote computer workstation to transfer data related to said document profile;

compiling, by said trusted repository system, tamper sealed data and a tamper sealed audit trail logically associated with said document profile;

verifying, by said trusted repository system, said digital signature applied to said tamper sealed audit trail associated with said document profile.

16. The method of compiling and transferring verifiable transaction data according to claim 15, further comprising the steps of:
   storing an information object related to said document profile in said secure database management system; and
   updating said audit trail logically associated with said document profile; and
   applying, by the trusted repository system, a digital signature and date-time stamp to said updated audit trail logically associated with said document profile.

17. The method of compiling and transferring verifiable transaction data according to claim 15, further comprising the steps of:
   storing an information object related to said transaction profile in said secure database management system; and
   updating said audit trail logically associated with said transaction profile; and
   applying, by the trusted repository system, a digital signature and date-time stamp to said updated audit trail logically associated with said transaction profile.

\* \* \* \* \*